US007783549B1

(12) United States Patent
Benson et al.

(10) Patent No.: US 7,783,549 B1
(45) Date of Patent: Aug. 24, 2010

(54) TRANSACTION PROCESSING SYSTEM AND METHOD

(75) Inventors: Gregory Paul Benson, Saugus, MA (US); Paul James Garside, Watertown, MA (US); Jeffrey Glatstein, Grafton, MA (US); Vidya P. Haran, Irvine, CA (US); Shari Lynne McCusker, North Reading, MA (US); Michael Nemerowski, Medfield, MA (US)

(73) Assignee: SunGard Financial Systems LLC, Hopkins, MN (US)

( * ) Notice: Subject to any disclaimer, the term of this patent is extended or adjusted under 35 U.S.C. 154(b) by 121 days.

(21) Appl. No.: 11/710,448

(22) Filed: Feb. 26, 2007

(51) Int. Cl.
*G06Q 40/00* (2006.01)
(52) U.S. Cl. .................................. 705/36 R; 705/37
(58) Field of Classification Search .......... 705/36 R–37
See application file for complete search history.

(56) References Cited

U.S. PATENT DOCUMENTS 6,513,019 B2 * 1/2003 Lewis .......................... 705/35
2005/0204048 A1 9/2005 Pujol et al.

* cited by examiner

*Primary Examiner*—Thu Thao Havan
(74) *Attorney, Agent, or Firm*—Morgan Lewis & Bockius LLP

(57) ABSTRACT

A system for processing securities transactions includes a client module to obtain transaction data corresponding to a plurality of heterogeneous financial products from at least one external operational system, a transaction engine that processes the transaction data from the client module to convert and normalize the transaction data, and stores the converted transaction data as a series of temporal events in a transaction database, and a data access module to provide access to the converted transaction data stored in the transaction database.

36 Claims, 5 Drawing Sheets

TRANSACTION PROCESSING SYSTEM AND METHOD

BACKGROUND OF THE INVENTION

The present invention claims the benefit of U.S. patent application Ser. No. 11/485,634 filed on Jul. 13, 2006, which is incorporated wherein by reference.

FIELD OF THE INVENTION

The present invention relates to a transaction management system and method, and more particularly to a transaction management system and method operating on a common services architecture.

DISCUSSION OF THE RELATED ART

With the globalization of trading and the expansion of trading hours, the financial industry has been striving to reduce down time for batch processing cycles and to eventually eliminate the down time altogether. To that end, there is a need for a transaction system that is available 24×7 for all operations functions, including trade capture.

Another trend in the financial markets is the disintegration of traditional financial product boundaries. There are increasingly more and more requirements to process different instrument types in a single portfolio and therefore upon a single system. In the United States, the introduction of security futures creates the need to process stocks, equity, options, and futures products in a single account. A competitive advantage for firms will be the ability to process these instruments and their margins together. Also, cross-margin agreements between bonds and futures on bonds are becoming more common. For instance, in the United Kingdom and across continental Europe, the movement to a clearing model of central counterparties is creating an environment where clearinghouses act as the clearing agent for numerous types of instruments. As a single clearinghouse takes on the role of clearing more product types, they will be able to offer margin or collateral benefits that more accurately reflect the risk of an account. Firms that are able to process these different instruments in one system will be able to take advantage of the margin and collateral reductions.

The securities transactions in conventional trading systems are processed by a collection of settlement engines that process particular transactions depending on the type of instruments that are being traded. Accordingly, process applications used in the transaction processing environment of the prior art are captive to the specific type of the settlement engine dictated by the type of financial instrument being traded. Hence, the transaction processing environment of the prior art has no economies of scale, has too many moving parts, has little consolidation, and is captive to technology and third parties. In such an environment, integration becomes extremely expensive and costly, and sometimes impossible.

SUMMARY OF THE INVENTION

Accordingly, the present invention is directed to a transaction processing system that substantially obviates one or more problems due to limitations and disadvantages of the related art. There are two characteristics of the transaction system of the present invention that provide the largest benefits: a real-time, continuous processing system and the ability to process instruments on one platform that have traditionally been processed in separate silos.

Other benefits of the transaction system of the present invention include reduction of migration or conversion risk by providing a phased path for retiring legacy systems, integration with any legacy system that processes products supported by the transaction processing system of the present invention allowing retirement and consolidation of multiple vendor and/or proprietary systems, provides flexibility in component selection and therefore reduces vendor risk and allows firms to incorporate their own differentiating components into any particular solution, allows for easy, as-of processing and historical corrections, holistic analysis such as cross-margining, and ease of adding new products and processes enables firms to exploit new market opportunities as they arise.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for processing securities transactions includes a client module to obtain transaction data corresponding to a plurality of heterogeneous financial products from at least one external operational system, a transaction engine that processes the transaction data from the client module to convert and normalize the transaction data, and stores the converted transaction data as a series of temporal events in a transaction database, and a data access module to provide access to the converted transaction data stored in the transaction database.

In another aspect, a method of processing securities transactions in the steps of obtaining transaction data corresponding to a plurality of heterogeneous financial products from an external operational system, converting the received transaction data into a normalized transaction data, storing the normalized transaction data into a transaction database as a series of temporal events; and providing the normalized data stored in the transaction database to a data access module.

In yet another aspect, a system for processing securities transactions includes a data consolidator to obtain transaction data in a predefined format corresponding to a plurality of heterogeneous financial products from at least one external operational system on a continuous, real-time basis, and to convert the transaction data into a common format, a transaction database that stores the converted transaction data as a series of temporal events, and an interface consolidator to provide a common interface that allows access to the converted transaction data stored in the transaction database.

In still yet another aspect, a system for processing securities transactions includes a transaction interface to obtain transaction data corresponding to a plurality of heterogeneous financial products from at least one external operational system on a continuous, real-time basis, a transaction engine that processes the transaction data from the client module to convert and normalize the transaction data, and stores the converted transaction data as a series of temporal events in a transaction database, and a data access module to provide access to the converted transaction data stored in the transaction database.

In yet another aspect, a method of processing securities transactions includes the steps of obtaining transaction data corresponding to a plurality of heterogeneous financial products from an external operational system on a continuous, real-time basis, converting the received transaction data into a normalized transaction data, storing the normalized transaction data into a transaction database as a series of temporal events, and providing the normalized data stored in the transaction database to a data access module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The transaction system according to the present invention is a next generation of operations systems for the financial and investment sector. The transaction system of the present invention includes a robust transaction posting and position management engine for integrating legacy operations systems. Around the transaction engine, functional components are built to extend the functionality of the transaction system of the present invention.

Figure 1:
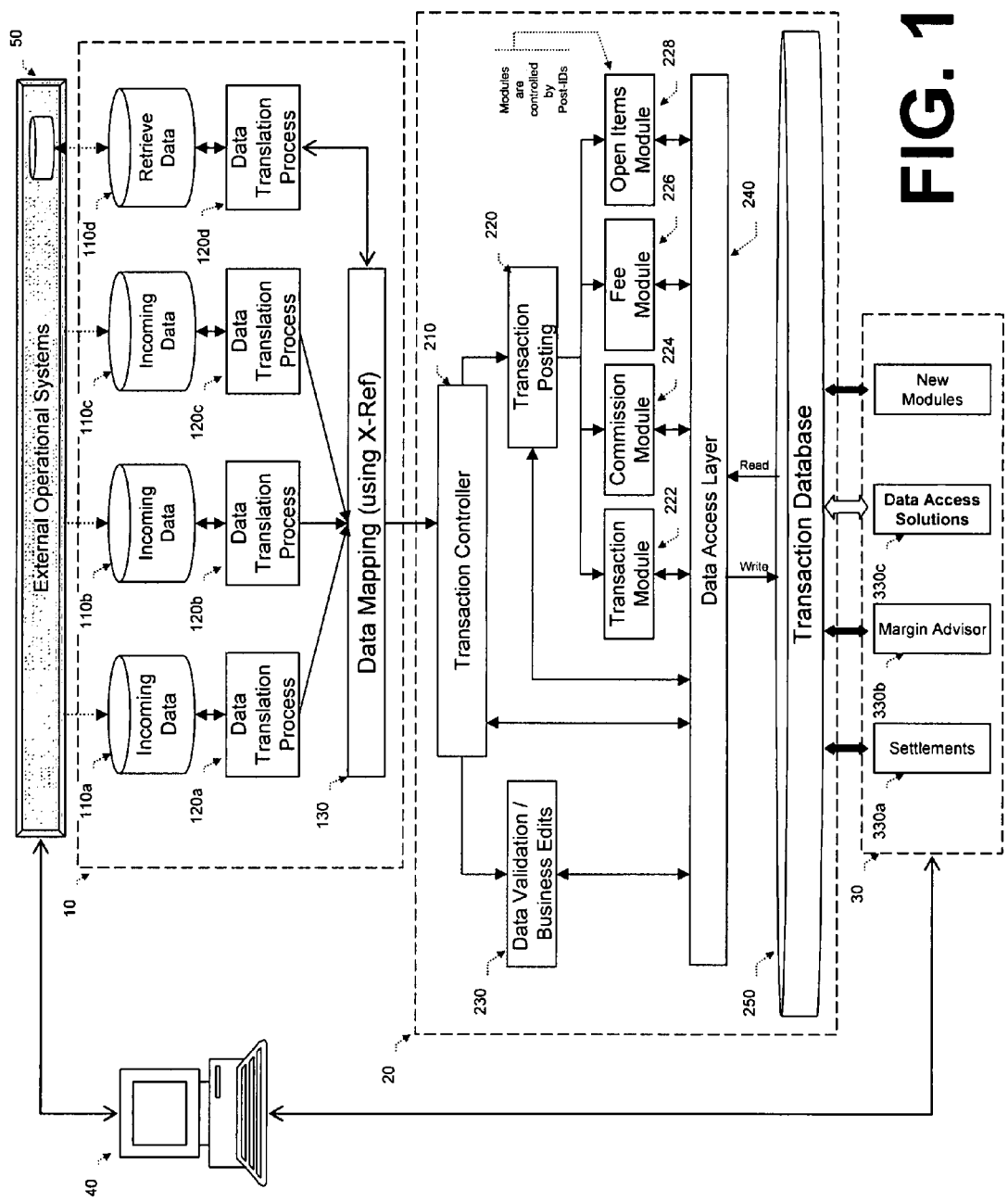
FIG. 1 is a diagram illustrating an overview of an exemplary architecture of the transaction processing system according to the present invention.

In particular, FIG. 1 is a diagram illustrating an overview of an exemplary architecture of the transaction processing system according to the present invention. As shown in FIG. 1, the transaction processing system 1 includes a translational interface 10 that obtains heterogeneous transaction data from external operational systems 50, a transaction engine 20 that processes the transactions from the external operational systems 50, and one or more application modules 30 that provide functional interfaces between the transaction engine 20 and a user workstation 40. The external operational systems 50 may be any financial source of transactional data, such as core settlement engines for various financial markets, trading systems, back office systems, and the like.

A user (not shown) accesses the transaction engine 20 and various applications modules 30 through the workstation 40. Although only one workstation 40 is shown, multiple workstations may be connected to the transaction processing system 1 without departing from the scope of the present invention. The workstation 40 may be connected to the transaction processing system 1 directly through dial-up, a local area network (LAN), wide area network (WAN), or the Internet. Other communication interfaces may be used, such as wireless communications, without departing from the scope of the present invention.

The transaction processing system 1 is a multi-tiered on-line transaction processing ("OLTP") engine designed to deliver a system that is simpler, faster, more scalable, and continuously available in a real-time, high-volume environment. The transaction processing system 1 is preferably built upon a relational database model that processes an existing array of products currently handled in transaction back-office systems. Accordingly, the transaction processing system 1 can facilitate the processing of new products (e.g. single stock futures) without requiring data model re-engineering and with minimal impact on development as product characteristics evolve.

In particular, the transaction processing system 1 consolidates heterogeneous transaction data from external sources into normalized, homogenous transaction data. Accordingly, the transaction processing system 1 complements any existing legacy back-office system and provides a data processing solution that spans across traditionally distinct system lines, including derivatives, FX and equity spaces. The transaction processing system 1 is a real-time, continuous system that processes a complete spectrum of a firm's or an account's trading activity, thus providing consolidated processing and a consolidated view of an account. The consolidation and normalization of the transaction data allows timelier and more accurate risk analysis, access to information, and the ability to trade continuously (i.e., 24 hours a day, 7 days a week).

As shown in FIG. 1, the transaction processing system 1 includes a transaction interface 10 to maintain integrity between the applications and the layer that reads, transforms, and feeds the transactions from the external operational systems 50 to the transaction engine 20. In an exemplary embodiment, the transaction data from the external operational systems 50 are replicated to the staging databases 110a, 110b, and 110c. Although only three staging databases are shown for purposes of example, any appropriate number of staging databases may be used without departing from the scope of the invention. Preferably, there is a one-to-one mapping between each file in the external operational systems 50 and transaction client tables in the staging databases 110a-110c.

Each of the data translation processes 120a, 120b, and 120c is a multi-threaded application, continuously polling the corresponding transaction client table in the staging databases 110a-110c, respectively, for new transactions. As and when there are new transactions in the table, the transactions are picked up for processing by the data translation process assigned to the corresponding table. Each transaction then goes through a set of data transformation and data mapping process to convert the transaction data into a format acceptable to the transaction engine 20. The data translation processes 120a-120c enable the pumping of multiple numbers of simultaneous transactions to the transaction engine 20. The following parameters about the data translation processes 120a-120c are configurable:

The frequency at which the transaction client tables in the staging databases 110a-110c are polled for data. This enables high-volume transaction client tables to be polled more frequently than low-volume transaction client tables.

The number of simultaneous transactions (or the load) that can be sent to the transaction engine 20.

Transactions can come into the staging databases 110a-110c in real-time or in batches. Preferably, the transaction data are replicated to staging tables in the staging databases 110a-110c in the transaction interface 10. The transaction data may be in any format. Moreover, the transaction data may be sent to the transaction interface 10 or the transaction interface 10 may read the transaction data directly from the external operational systems 20, as represented by the staging database 110*d* and translation process 120*d*. The process of obtaining transaction data from the external operational systems 50 will be explained in detail below.

Cross-reference tables 130 are used to support the data mapping of the replicated transaction data in the staging databases 110*a*-110*c* to the converted transaction data in the normalized format stored in the transaction database 250. For example, the cross-reference tables 130 links account IDs and security IDs, to be explained further below, in the transaction data from the external operational systems 50 with the corresponding internal IDs in the transaction database 250.

The transaction engine 20 includes a transaction controller 210, which is a main application programming interface ("API") into the transaction engine 20. The transaction controller 210 is capable of receiving and handling a high number of concurrent requests. As an example, any request coming into the transaction engine 20 may be a synchronous request. That is, if the transaction is processed successfully it is committed and returned a success. In case of failure, the transaction is rolled back, an error message is logged, and a failure is returned to the calling client. However, the processing for different transactions may be configured in a variety of ways without departing from the scope of the invention.

The transaction engine 20 integrates unified static data obtained from the replicated data by sending the normalized transaction data to the transaction posting module 220. Depending on the transaction type, the transaction posting module 220 sends the normalized transaction data to one of the following modules: transaction module 222, commission module 224, fee module 226, and open items module 228. To be explained in detail below, each of the modules are controlled by post IDs in the normalized transaction data. Accordingly, the transaction posting module 220 loads the integrated data into transaction tables in the transaction database 250 through the data access layer 240, such as a database manager. Thus, the transaction activities received from the external operational systems 50 are converted into normalized transaction data and posted to position and money balance tables in the transaction database 250. The transaction engine 20 further includes a data validation/business edits module 230 to validate the converted data from the transaction interface 10. The converted data is checked to determine if the data has been properly normalized into a format that is valid for storage in the transaction database 250.

The transaction system 1 works in conjunction with existing operational systems, which continue to operate in their current state (i.e., no modification is required). Transactional activity processed within the external operational systems 50 are fed into the transaction engine 20. The transaction engine 20 processes the activities and uses the events to maintain positions and balances within the transaction database 250. While positions may be fed into the transaction engine 250, one of the primary functions of the transaction engine 20 is to build the positions from transaction activities fed into it. Accordingly, beyond the initial set-up, it is not necessary to send balance and position information to the transaction engine 20. Rather, the transaction engine 20 maintains positions based upon the activities it receives from the external operational systems 50.

The transaction processing system 1 further includes an application module 30 to provide various functionalities to the user. As an example, the application module 30 includes a settlements module 330*a*, margin advisor module 330*b*, and data access solutions module 330*c*. Other applications (indicated as "New Modules") may be added onto the transaction engine 20 to provide additional functionalities.

The settlements module 330*a* provides end-to-end straight-through processing of securities and listed derivatives. The settlements module 330*a* provides a real-time central interface management service that connects custodians, broker/dealers, banks, and futures commission merchants to custodians, depositories, and clearing institutions for trade comparison, reconciliation, clearance, and settlement. The settlements module 330*a* provides central management of clearance and settlement interfaces for the transaction data received from the external operational systems 50 processed by the transaction engine 20. Moreover, any transaction data resulting from the settlements module 330*a* may be send back into the transaction engine 20.

The margin advisor module 330*b* is an end-of-day, real-time margin monitor that enhances margin capabilities of the legacy systems by providing a collection of data across all security types using the normalized transaction data in the transaction database 250. The margin advisor module 330*b* interacts with of the transaction engine 20 through events that automatically trigger actions and provides real-time information to the user workstation 40 via a user interface ("UI"). For example, a user can margin an account via the UI, or the user can have accounts margined automatically either when a price fluctuates beyond a set tolerance or every time the balance or position changes for a specific account. In addition, an end of day process can be put into place to automatically margin all accounts.

The data access solutions module 330*c* includes various data access functions such data marts, web access, replication, and ETL (i.e., extract, transform, and load) interfaces. For example, the transaction processing system 1 may provide reports for distribution through the data access solutions module 330*c*. Reports can be distributed via ftp, email, or proprietary viewer utility applications. Formats for reports can be .pdf, .txt, .html, or other proprietary format. The transaction processing system 1 can also load raw reporting data into a spreadsheet and deliver the spreadsheet via the methods of distribution described above. The transaction processing system 1 also has the ability to send data to the back office via APIs.

Figure 2:
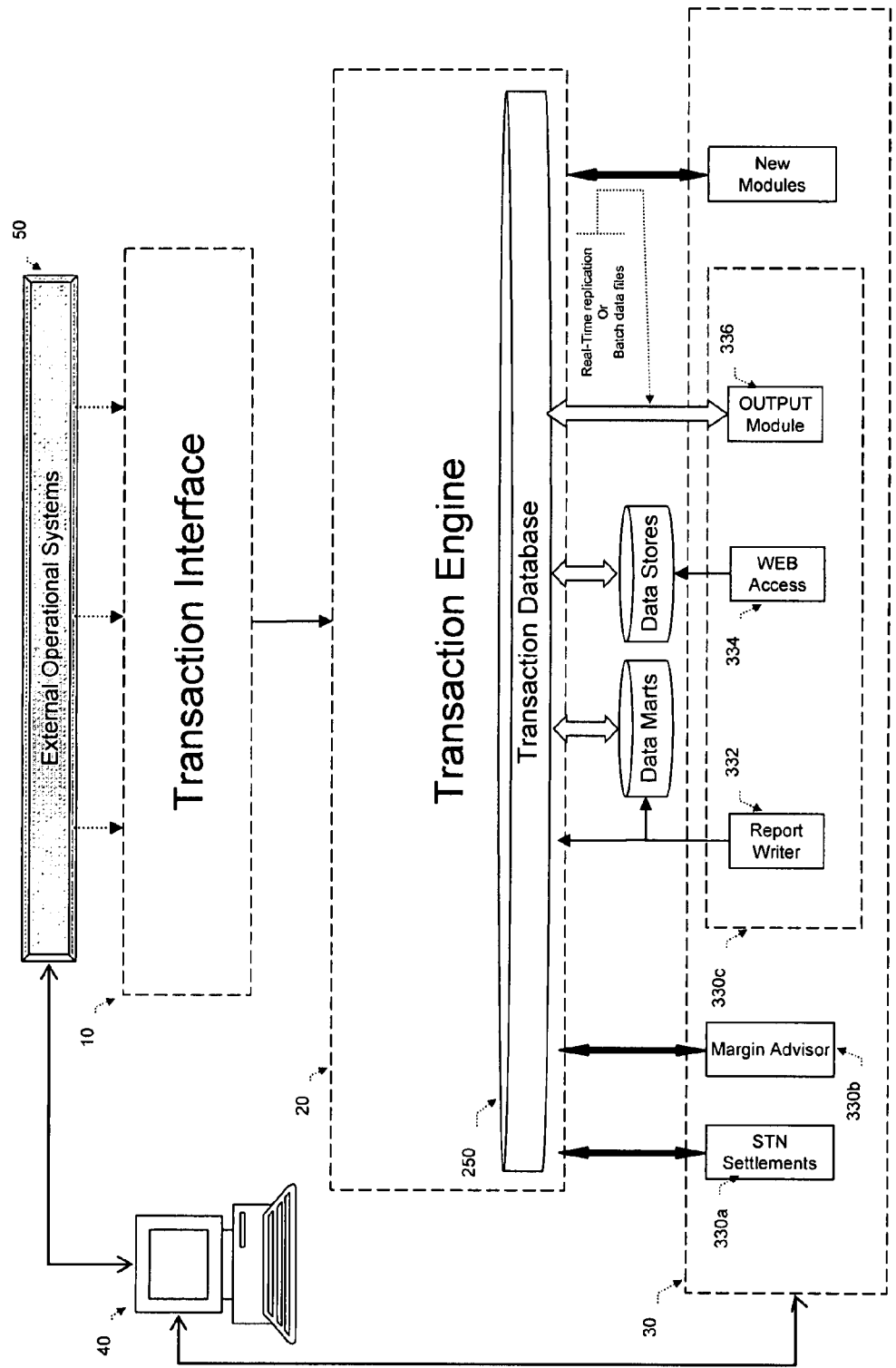
FIG. 2 is a diagram illustrating an exemplary embodiment of the data access solution module 330c of FIG. 1.

FIG. 2 illustrates an exemplary embodiment of various sub-modules in the data access solutions module 330. As shown in FIG. 2, report writer 332 provides a number of reports to support margin processing and transactional research. The reports are supported by the data stored in the transaction database 250 and data marts developed to support the reports.

The report writer 35 provides an open, standards based solution for accessing and reporting on data from the external operational systems 50. End users can access the data they need by using the report writer's open relational database management system and reporting tools. With these tools, the end user can directly query and report on a wide variety of data elements from a particular source of the external operational systems 50. Reports can be saved, refreshed, modified and easily shared. The report writer 332 uses the normalized data model of the transaction engine 20 to provide end users with the ability to design, modify, and run a variety of reports on their own. Through the use of the sophisticated reporting tools available on the report writer 332, the end user can control access to data and reports. Access rights can be applied at individual or group levels and can be used to control design, modification and viewing of reports. Reports can also be actively distributed to other members via email and web delivery available through the data access solutions module 330c. The report writer 332 in conjunction with the transaction engine 20 is designed to work with virtually unlimited amounts of historical data. The comprehensive data model used within the transaction engine 20 provides a powerful tool for data integration and for better understanding and use of securities operations data. The sophisticated continuous, real-time replication and data mapping technologies of the transaction engine 20 enable the real-time transformation of data into the normalized data model.

The web access module 334 provides accessibility to the transaction engine 20 through a web portal, for example. The output module 336 provides real-time replication or batch files of the normalized transaction data from the transaction engine 20 to external networks and systems.

In an exemplary embodiment, the transaction system 1 includes a multi-processor central processing unit and a relational database. The transaction system 1 is connected the external settlement systems 20 via Internet-based communications protocol (e.g., TCP/IP). However, other processors, hardware components, software applications, and communication protocol may be used without departing from the scope of the present invention.

For instance, while any database product may be used without departing from the scope of the invention, ORACLE is used for purposes of example. ORACLE is an open platform database that supports many methods of retrieving data out of the database. Three exemplary methods are outlined below. It should be noted that other methods may be used without departing from the scope of the present invention. In the exemplary embodiment, the transaction engine 10 uses a combination of an SQL query and FTP script to deliver tab delimited files, for example, of a targeted subset of data from the transaction database 70. The scripts may be run at night as part of end of day processing. In addition, database application tools are used to implemented trigger based Oracle-to-Oracle replication for the transaction database 70. These tools allow data to be targeted at the table, column, and/or row level. These tools allow users to receive only the fields of tables needed. The transaction engine 10 has the ability to target the specific data needed to meet requirements. The triggers used for replication are very light and have little impact on database interaction as they are used to move data into a queue for further processing.

Having described the overall system of the present invention, the details of the data processing will now be described. There are three basic steps for a transaction entering the transaction engine 20:

Internal Security ID conversion—The entering transaction can use any format (e.g. symbol, CUSIP, etc) for the security. Internally, it is mapped to a security ID.

Internal Account ID conversion similar to the security ID conversion.

Post ID determination—Based on the attributes of the transaction, each transaction will be assigned a post ID.

The transaction system 1 takes in both transaction and support data. The transaction data can be almost any back office transaction including executions, trades, stock movements, and cash items. In order to process this data, the application also takes in data needed to support the transactions (i.e. name and address, account types, securities, etc.). The transaction system 1 handles data that is replicated, read from an external server directly, entered directly through the UI, and/or processed from downloads depending on the client's needs.

While any type of data transfer can be used to obtain transactional data from an existing legacy system with the only requirement being that the existing system be able to populate the client tables and provide any of the reference data required to process the transactions, replication is the least intrusive method to existing systems and therefore is used as the exemplary embodiment for describing the present invention. Using data replication, all the required transactions and information can be extracted from the source system without any programming modifications to the source system, thereby eliminating the dependency on development in the source system to integrate into the transaction system of the present invention. Moreover, replication offers virtually real time data since the information is processed as soon as it is committed into the table. Data from several tables can be combined into one transaction if needed.

Alternatively, the transaction engine 20 can access the source servers directly. Direct access may require modifications on the legacy side depending on the set-up to allow the transaction engine 20 to have direct access. In other situations, data can be entered directly into the transaction engine using its UI. Generally, these types of data are related to support data or margin processing. Generally, data from transactions coming into the system cannot be changed using this method.

The transaction engine 20 also processes data from downloads in a flat file format. This can be scheduled or event based. The following data is an exemplary transaction from a nightly execution upload that is matched against a trade entered into the system. However, this is just an example and files having other formats may be used without departing from the scope of the invention.

| Firm | Acct | Acct Type | Symbol | Buy/Sell | Quantity | Price | Link ID |
|---|---|---|---|---|---|---|---|
| FPKR | 153057007 | 2 | SUNW | S | 000000000300000000009302633 | 3.9948000 | 028968510 |

20041018
Trade Date

The transaction engine 20 is flexible in the format of the data that is processed. It reads data from tables, flat files, and accepts messages sent by other objects. A transaction will be processed as long as it has the required fields populated. The incoming data is processed into the transaction engine either by SQL triggers or by JAVA processes, for example. Simple data and conversion is preferably handled with triggers. When one of these records is inserted, updated, or deleted, a trigger does the translation and updates the transaction database 250 accordingly. The triggers may be used for the maintenance of the reference data (e.g., office, registered representative, account types, statuses, etc.). In this example, JAVA processes do the bulk of the work for transactions. These objects scale to handle the load and do more work since the data for transactions require more edits and the volume is usually heavier. Other programming languages may be used without departing from the scope of the present invention.

The following lists represent exemplary data replicated from the respective operational systems 50. Preferably, all information is replicated from the legacy systems to the transaction system 1 in real-time:

Front-End Transaction Replication
Trade Detail
Cash Detail
Stock Detail
Customer Master—A thin version of the customer master file is replicated over to the transaction interface 10. This file contains enough information to make the positional and transactional data in the transaction database 250 usable. Alternatively, a master customer master utility may be built within the transaction interface 10.
Security Master—A thin version of the security master file is replicated over to the transaction interface 10. This will contain enough information to make the positional and transaction data in the transaction database 250. Alternatively, a master security master utility may be built within the transaction interface 10.
Back-End Transaction Replication
Transactions—Transactions data available at trade entry is replicated to the transaction interface 10. Information such as commissions and fees are generally not available until after night processing. Accordingly, commissions and fees on transactions is preferably replicated over to the transaction interface 10 in batch mode via the activity file coming out of the night processing stream.
End-of Day Batch Activities—All activity that is performed on positions as well as enrichments to trades that occur in the night processing stream is preferably replicated over to the transaction interface 10 once the night stream has completed.
Customer Master—A thin version of the customer master file is replicated over to the transaction interface 10. This will contain enough information to make the positional and transactional data in the transaction database 250 usable. Alternatively, a master customer master utility may be built within the transaction interface 10.
Security Master—A thin version of the security master file is replicated over to the transaction interface 10. This will contain enough information to make the positional and transaction data in the transaction database 250 usable. Alternatively, a master security master utility may be built within the transaction interface 10.

The transaction engine 20 uses post IDs for processing the various transactions that occur in the legacy system. These post IDs provide flexibility for the transaction engine 20. All of the characteristics and required processing associated with a transaction are defined in a posting table. When a transaction is sent to the transaction engine 20, a post ID is assigned to the transaction informing the system of the transaction characteristics as well as the posting rules and timing of postings and processing. The post ID process provides flexibility in a number of different ways.

First, it allows a firm to define how certain instruments should be processed for a particular transaction type. As an example, for futures transactions, a post ID would be utilized to instruct the system to post the transaction to the transaction table, post the transaction to the position table, make the new transaction available for offsetting, and track the open trade equity for the position. If the same futures transaction arrives at the transaction engine for an account previously set as an instruct account, then the transaction engine 20 will point to a post ID similar to the previous example except it would not make the new transaction available for offsetting.

The post ID table is used to trigger other business processes once the business components are in place. For example, a post ID flag would instruct the system as to whether commissions and fees are calculated for the transaction, whether margins should be recalculated for the account, and whether automatic offsetting should be invoked.

The second flexibility benefit that the post ID table provides is in the type of instruments that can be processed within the transaction engine 20. The processing of financial instruments can be broken down into a limited number of characteristics and processing functions. Different instrument types are simply different variations of those functions or combinations of those characteristics. With a flexible table identifying the different functions and characteristics, new instrument types can be processed within the transaction engine 20 by establishing new post IDs.

Third, the post ID table allows for flexibility in how the transaction system 1 is deployed for a particular firm. For example, a firm can either send only the transactional information and post all positions and balances based upon those transactions, or send positions from a legacy system and not attempt to build the positions via posting from the activity sent to the transaction engine 20. The first method is an OLTP that is central to the firm's operations. The second method is using the transaction engine 20 as a warehouse. Either method is available in the transaction engine via post IDs. In addition, the warehouse method provides a migration path to using the transaction system 1 as an OLTP to facilitate the ease of conversion.

The transaction engine 20 is built upon a temporal data model and is in third normal form (3NF) with some exceptions. Positions and transactions are maintained within transaction database 250 in a temporal fashion. That is, their state is preserved at any point in time and can be referenced from the functional components that process upon the transaction database 250. For example, if a regulatory reporting function needs to be performed at the close of a particular market but trading is still occurring in other markets, the reporting component can be directed to the temporal interval of the transaction database representing the close of the market of interest while new transactions are still added to the transaction database 250. In other words, the transaction engine 20 moves the transaction system 1 from a real-time system to a continuous system. The transition can be made to a continuous system because there are certain processes that require a static snapshot of data at a particular point in time. With the transaction engine 20, the processes that require that snapshot can be pointed at data from an earlier interval of the data while new transactions can be loaded to the current interval allowing the system to remain functional.

This temporal approach also provides for an easy, accurate platform for performing "as-of" processing. If a particular function was missed that requires or affects positional balances, the transaction engine 20 can go back to the earlier interval of positions and perform that function. For example, if a dividend payment was missed for a particular security, the dividend-processing component may be pointed at the stock record from close of market five days ago to determine what the appropriate dividend payouts should be.

In one embodiment, the transaction engine 20 is set to be updated at fixed intervals. While the default interval may be set at one day (i.e., daily), the interval is configurable to be by the minute, hourly, weekly, or monthly with a change to an application switch. Additionally, the intervals of the transaction processing can be event driven or user set. For instance, there are definite points in the day when a snapshot of data is needed. However, these points in time do not necessarily correspond to a set time on the clock. Accordingly, using an event driven interval becomes advantageous with the number of markets that are processed within the transaction engine 20. For example, there may need to be four different cut-offs for four different markets between 5 pm and 6 pm and none between 2 pm and 4 pm. Event driven intervals allow a firm to bring the intervals close together in heavy periods (i.e., when multiple markets are closing) and space them out when that level of granularity is not needed (e.g., middle of the trading day). For instance, when the day trading session for the Chicago markets end and all of the trades and instructions have been entered into the transaction engine 20, the user may trigger the end of Chicago markets event in the transaction engine 20. All large trader reporting, PCS reporting, and CFTC reporting for the Chicago markets may be pointed at this interval of the database and night trading data may simultaneously be input to the current interval. The amount of time required to get the necessary data in the system varies from day to day. Accordingly, it is difficult to use intervals set by the clock as cutoff may be at 5:45 today and 6:10 tomorrow. The event driven interval of the transaction system 1 overcomes this problem with ease.

The operation of the transaction system 1 will be explained using an exemplary scenario as a series of sample transactions best illustrates the usage of the temporal database according to the present invention. Specific dates, times, and values used are for illustrative purposes only.

On Dec. 1, 2006 at 9:15 am, account 123 buys 50 shares of security 456 in currency 111 at $25.00/share. This is a "cash" trade that has an account type of 1. Trade date is Dec. 1, 2006, settle date Dec. 5, 2006. The location code for the security is 5. The cash location is 99. The transaction in the transaction database 250 appears as follows:

| Acct | Type | Sec | Loc | Eff | Traded | Settled | Delivered |
|---|---|---|---|---|---|---|---|
| 123 | 1 | 456 | 5 | Dec. 1, 2006 9:00 | 50 | 0 | 0 |
| 123 | 1 | 456 | 5 | Dec. 5, 2006 0:00 | 0 | 50 | 0 |
| 123 | 1 | 111 | 99 | Dec. 1, 2006 9:00 | 1250 | 0 | 0 |
| 123 | 1 | 111 | 99 | Dec. 5, 2006 0:00 | 0 | 1250 | 0 |

On Dec. 1, 2006 at 9:35 am, account 123 buys 50 shares of Security 456 in currency 111 at $25.00/share. This is a "cash" trade that has an account type of 1. Trade date is Dec. 1, 2006, settle date Dec. 5, 2006. The location code for the security is 5. The cash location is 99.

| Acct | Type | Sec | Loc | Eff | Traded | Settled | Delivered |
|---|---|---|---|---|---|---|---|
| 123 | 1 | 456 | 5 | Dec. 1, 2006 9:00 | 100 | 0 | 0 |
| 123 | 1 | 456 | 5 | Dec. 5, 2006 0:00 | 0 | 100 | 0 |
| 123 | 1 | 111 | 99 | Dec. 1, 2006 9:00 | 2500 | 0 | 0 |
| 123 | 1 | 111 | 99 | Dec. 5, 2006 0:00 | 0 | 2500 | 0 |

On Dec. 2, 2006 at 10:25 am, account 123 buys 150 shares of Security 456 in currency 111 at $20.00/share. This is a "cash" trade that has an account type of 1. Trade date is Dec. 2, 2006, settle date Dec. 6, 2006. The To_Location on the trade is "S," which has a location ID of 5.

| Acct | Type | Sec | Loc | Eff | Traded | Settled | Delivered |
|---|---|---|---|---|---|---|---|
| 123 | 1 | 456 | 5 | Dec. 1, 2006 9:00 | 100 | 0 | 0 |
| 123 | 1 | 456 | 5 | Dec. 2, 2006 10:00 | 150 | 0 | 0 |
| 123 | 1 | 456 | 5 | Dec. 5, 2006 0:00 | 0 | 100 | 0 |
| 123 | 1 | 456 | 5 | Dec. 6, 2006 0:00 | 0 | 150 | 0 |
| 123 | 1 | 111 | 99 | Dec. 1, 2006 9:00 | 2500 | 0 | 0 |
| 123 | 1 | 111 | 99 | Dec. 2, 2006 10:00 | 3000 | 0 | 0 |
| 123 | 1 | 111 | 99 | Dec. 5, 2006 0:00 | 0 | 2500 | 0 |
| 123 | 1 | 111 | 99 | Dec. 6, 2006 0:00 | 0 | 3000 | 0 |

On Dec. 5, 2006 at 4:00 pm, account 123 moves $2500 (currency security ID 111). The movement is from location 12 (an account with a previous balance of $10,000) to location 5.

| Acct | Type | Sec | Loc | Eff | Traded | Settled | Delivered |
|---|---|---|---|---|---|---|---|
| 123 | 1 | 456 | 5 | Dec. 1, 2006 9:00 | 100 | 0 | 0 |
| 123 | 1 | 456 | 5 | Dec. 2, 2006 10:00 | 150 | 0 | 0 |
| 123 | 1 | 456 | 5 | Dec. 5, 2006 0:00 | 0 | 100 | 0 |
| 123 | 1 | 456 | 5 | Dec. 6, 2006 0:00 | 0 | 150 | 0 |
| 123 | 1 | 111 | 99 | Dec. 1, 2006 9:00 | 2500 | 0 | 0 |
| 123 | 1 | 111 | 99 | Dec. 2, 2006 10:00 | 3000 | 0 | 0 |
| 123 | 1 | 111 | 99 | Dec. 5, 2006 0:00 | 0 | 2500 | 0 |
| 123 | 1 | 111 | 12 | Dec. 5, 2006 16:00 | 0 | 0 | 7500 |
| 123 | 1 | 111 | 5 | Dec. 5, 2006 16:00 | 0 | 0 | 2500 |
| 123 | 1 | 111 | 99 | Dec. 6, 2006 0:00 | 0 | 3000 | 0 |

To determine balances as of the close of business on Dec. 5, 2006, a simple sum of the columns is required for all rows on or prior to that date/time.

| Sec | Loc | Traded | Settled | Delivered |
|---|---|---|---|---|
| 456 | 5 | 250 | 100 | 0 |
| 111 | 99 | 5500 | 2500 | 2500 |
| 111 | 12 | 0 | 0 | 7500 |

These figures indicate a pending settlement on both security 456 and 111. The incremental nature of the position model removes the need to "cascade update" rows after an event to reflect the total position. This is most important in an "as-of" trade situation. The query to sum the individual components of any given position should be sufficiently fast.

Because the account and security tables are key to the integration of activity from different systems, they are explained in more detail below.

The Account model includes all information pertaining to an account. An account may have different account identifiers on different source systems, and these may be combined within the transaction engine as a single entity. The main table housing account information is ACCOUNT. This has a unique primary index of Account_Id, a unique number assigned sequentially by the database and Generation, the date/time of the last account update. Previous account definitions are retained in their entirety to provide accurate account definitions at any point in time. Other information included in ACCOUNT includes data such as name and address information (including information for non-US addresses), State (which uses lookup table STATE), Country (which uses lookup table COUNTRY), tax identification number, and household ID.

The ACCOUNT_GROUP table is a vehicle to link accounts. This can be used for accounts within a group, or for relating accounts in a guarantee/guarantor relationship, for commission calculation threshold calculations, ROA calculations, and other relationships. Each group is assigned an Account_group_Id, a unique number assigned sequentially by the database. The Account_group_Id is specific to an Account_Id and a Source_System. By doing so rather than having the ACCOUNT_GROUP be specific to a transaction account, and potentially multiple source system accounts, the transaction engine is more flexible, allowing the various accounts at their lowest level to be grouped together or not at the users' discretion. The ACCOUNT_GROUP table contains the primary Account_Id associated with the group, if any, and the Source_System of that account.

The ACCOUNT_XREF table relates to ACCOUNT by Account_Id. There may be many rows in ACCOUNT_XREF for each ACCOUNT, one per Source_System. Additionally, there may be many ACCOUNT rows per ACCOUNT_XREF due to the temporal nature of the ACCOUNT table. Normally, the maximum value of Generation will be selected from ACCOUNT to return a single ACCOUNT and the corresponding ACCOUNT_XREF row(s) joined to that single ACCOUNT row.

Each ACCOUNT_XREF (account and source system) contains a Registered_Rep_Id. This cross-references by Registered_Rep_Id and Source_System to the Registered_Rep_Xref cross-reference table. Registered_Rep_Xref in turn relates to a single Office_Xref row, indexed by Office_Id and Source_System.

The Security model includes all information required to process any type of financial instrument, be it equity, fixed income, commodity, option, funding product, etc. Securities are grouped into a three-tiered grouping by sub-class, class, and product. These groupings are to be determined; however, the intent is to define specific instrument types by the sub-class (such as common stock, treasury bills, GNMA, etc.), groups of sub-classes into class (such as stock, treasuries, mortgage backs, etc.), and groups of classes into products (equities, fixed income, etc.).

Information common to all or most types of instruments are held on the SECURITY table. The primary unique index of this table is Security_Id, a unique number assigned sequentially by the database and Generation, the date/time the security was added or changed. Previous security definitions are retained in their entirety to provide accurate security definitions at any point in time. Other information on SECURITY includes date of issue, country of issue (which uses lookup table COUNTRY table through Issue_Country), denominated currency, description, and security class and subclass.

The security class from SECURITY uses lookup table CLASS, which contains the Product_Id and Description of the class. This in turn uses the PRODUCT table, which contains the Product_Id and a Description of the product.

Denominated currency from the SECURITY table uses lookup table CURRENCY through Security_Id where Currency. Generation is the largest value, which is less than or equal to Security. Generation. SECURITY also has a relationship to itself. The Denominated_Currency is itself a Security_Id.

Each security may have one or many entries on the SECURITY_XREF table linked by Security_Id. Multiple entries exist by Security_Xref_Type, denoting the type of security ID, e.g. user defined (UD), industry cusip (CU), ticker symbol (SY), etc., and Source_System. Due to the temporal nature of SECURITY, this is actually a many-to-many relationship. For example, typical data may include:

| Security_Id | Security_Xref_Type | Source_System | External_Security_Id |
|---|---|---|---|
| 512 | CU | P3 | 459200101 |
| 512 | SY | P3 | IBM |
| 512 | UD | P3 | IBMCORP |
| 512 | UD | GM | .12345678901 |

As the example illustrates, the first three columns are used to make a unique index.

In order to normalize the Security model and avoid data scarcity on the SECURITY table, subsidiary tables have been defined to house instrument-specific information. Each of these subsidiary tables has a primary unique index identical to SECURITY. None of these tables are required to exist, but if a row does exist, it has exactly one corresponding row in the SECURITY table. Some examples of the defined subsidiary tables are: EQUITY, OPTION, FIXED_INCOME, FUNDING, and COMMODITY.

There are several exemplary categories of tables. A definition of each group of tables, the purpose of each group, and each group's involvement in trade entry is listed below.

Aggregates
  Contain cumulative amounts and quantities grouped by common data (normally at a minimum account, security, and date/hour).
  Updated as a result of trade entry. May be done real-time or by a background process in near-time.
  Incremental in nature; each value updated on exactly one row.
  Temporal in nature.
Associative Tables
  Define associations between tables by storing related key values from each table. Used to resolve many-to-many relationships.
  Contain key elements only.
  Updated as a result of trade entry when the associated tables are updated by trade entry.
Cross-Reference Tables
  Relate source system identifiers with the transaction engine identifiers.
  Referenced during trade entry to determine the normalized ID related to an external system ID.
  Created during trade entry when a normalized ID does not exist for an external system ID.

Lookup Tables

Make the system self-documenting by giving descriptions to internal codes.

Not referenced by trade entry.

Generally contain a code and a description of the code.

Used for inquiry only.

Master Tables

Contain all basic transaction information.

Rows inserted or modified by trade entry, security movements, and cash movements.

Support Tables

Contain data peripheral to a transaction, such as details for a security or account. May eventually be used by business rules.

Not referenced by trade entry.

Initially used for inquiry only.

Figure 3:
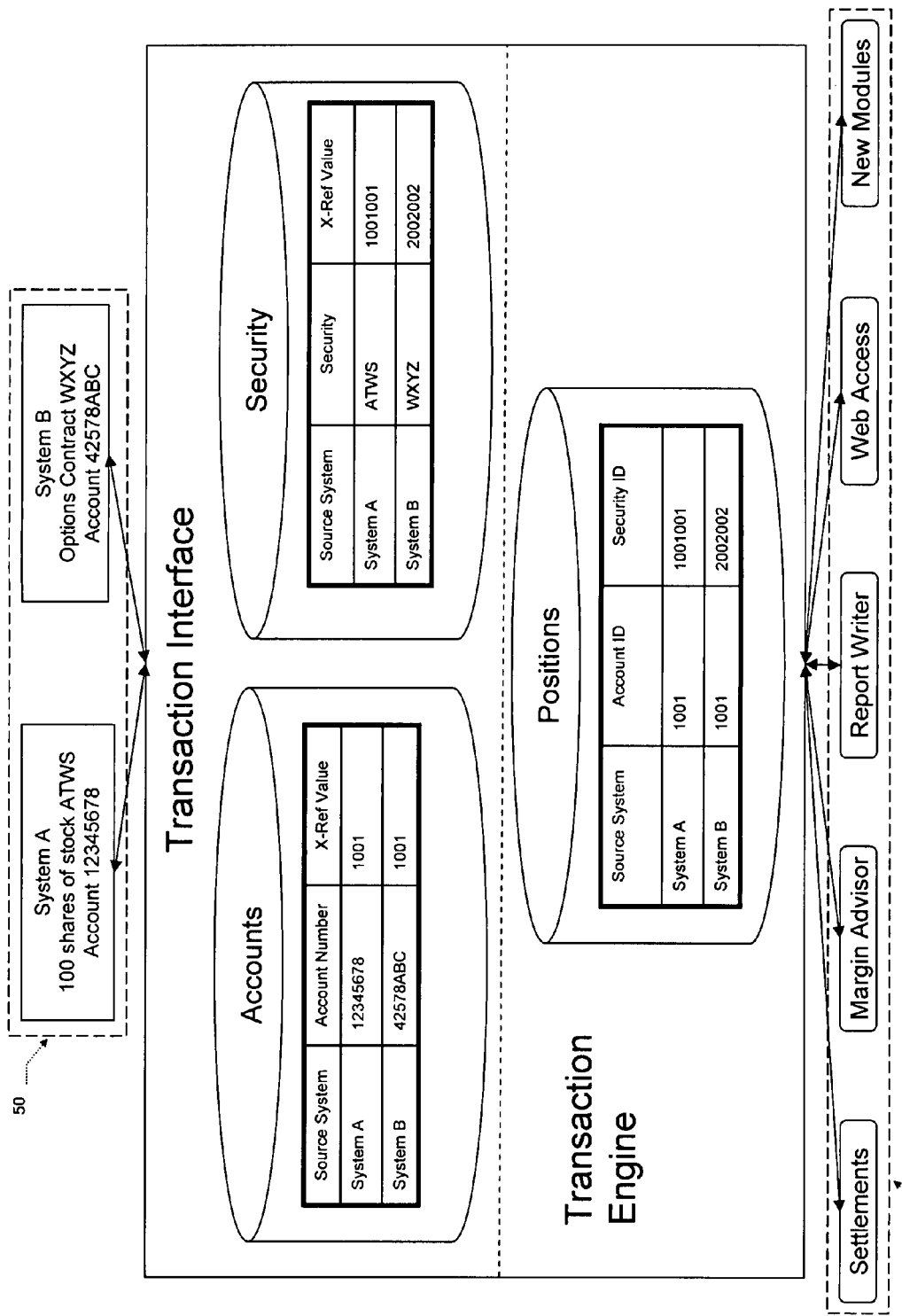
FIG. 3 is a block diagrams illustrating exemplary cross-referencing function according to the present invention.

FIG. 3 is a diagram illustrating an example of cross-referencing of Accounts IDs and Securities IDs according to the present invention. As an example, a cash transaction occurs on an operational system A, such as Phase3, regarding 100 shares of stock ATWS for Account 12345678. Also, a futures transaction occurs on another operational system, such as GMI, regarding options contract WXYZ for Account 42578ABC. What traditional systems do not know is that Account 12345678 and Account 42578ABC are actually the same entity. Because each of the operational systems process specific types of transactions, each system, such as Phase3 and GMI, employ separate transactional procedures, such as assigning their own account numbers for specific entities. Moreover, system A and system B do not share information as they are separate systems for their type of transaction.

In accordance with the present invention, FIG. 3 shows that the transaction data for Account 12345678 (i.e., transaction of stock ATWS) from system A and the transaction data for Account 42578ABC (i.e., transaction of option contract WXYZ) from system B are input to the transaction interface 10. As shown in FIG. 3, the transaction data are processed to determine that Account 12345678 and Account 42578ABC are actually the same entity. Accordingly, an internal ID (i.e., 1001) is cross-referenced to Account 12345678 and Account 42578ABC as they are owned by the same entity. Similarly, the transaction data is processed to assign internal IDs to each of the securities (i.e., stock ATWS and option contract WXYZ). Because these are different securities, they are each assigned a different internal ID (i.e., 1001001 and 2002002, respectively.) The converted transaction data is then sent to the transaction engine 20, which posts the positions of each account using the internal IDs generated in the cross-referencing stage. Accordingly, a user can access the normalized information using the applications module 30 to receive a holistic view of the entity's position that spans across heterogeneous transactions. Moreover, as both the accounts and security types are cross-referenced, the transaction processing system 1 may also provide cross-margining based on the normalized information using the Margin Advisor, for example.

Figure 4:
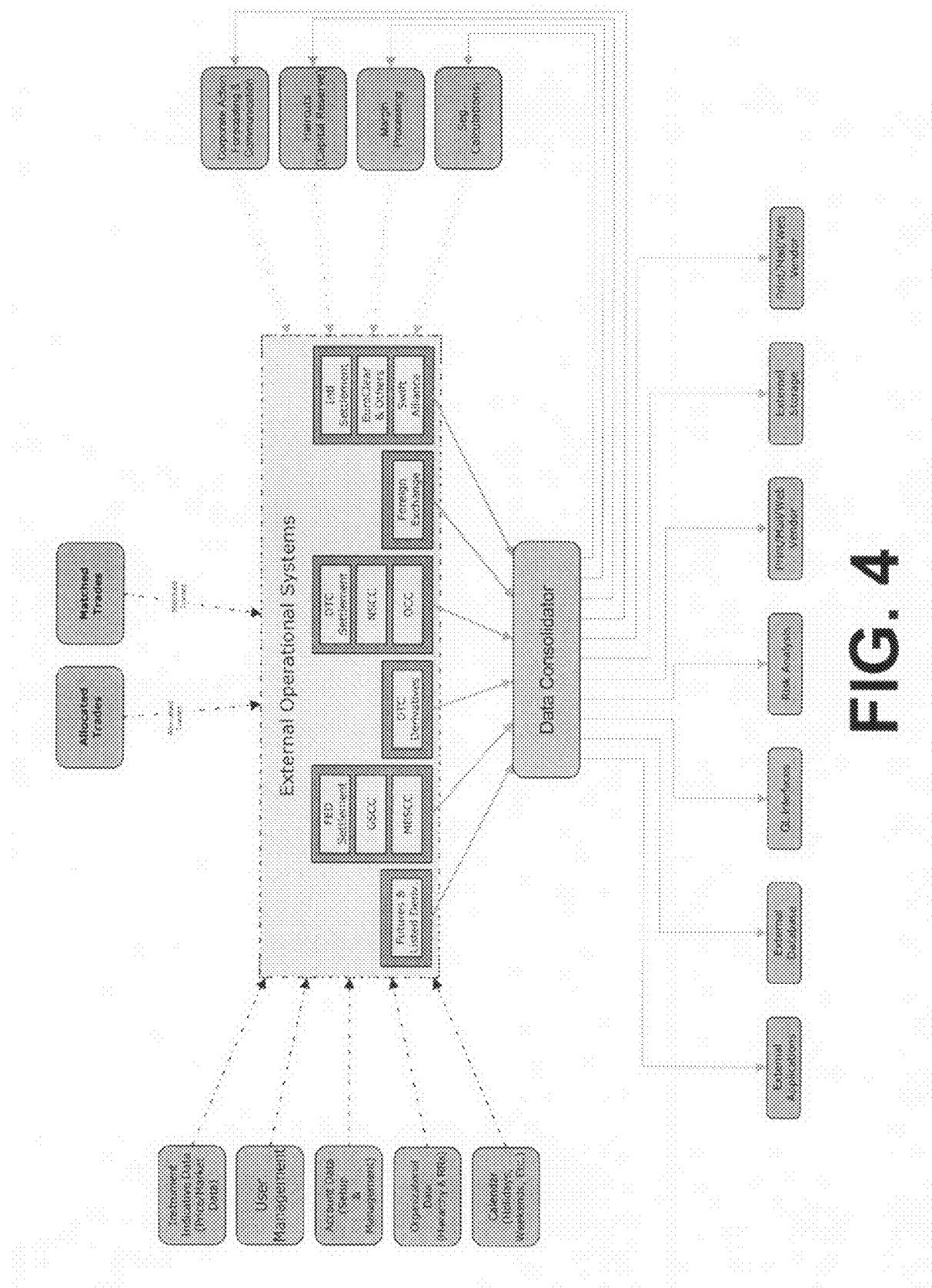
FIG. 4 is a block diagram illustrating an data simplification achieved using the transaction processing system according to the present invention.

FIG. 4 is a block diagram illustrating simplification of the transaction environment achieved using the transaction processing system according to the present invention. As shown in FIG. 4, the transaction processing system of the present invention acts as a "data consolidator" through which all of the heterogeneous transactions from the different external operational systems are converted into a homogenous collection of transactions that is accessible by different applications across the board. Unlike the "spaghetti system" of the prior art, the external applications are not captive to the various types of settlement engines. Accordingly, the data consolidator function achieved by the transaction processing system of the present invention significantly simplifies and unifies the processing environment across different financial instruments, settlement engines, and external applications and interfaces. As described above, by consolidating the transaction data across the different types of instruments in real-time continuous process, the transaction processing system of the present invention provides a holistic view of the activity that is difficult, if not impossible, to achieve in the system of the prior art.

Figure 5:
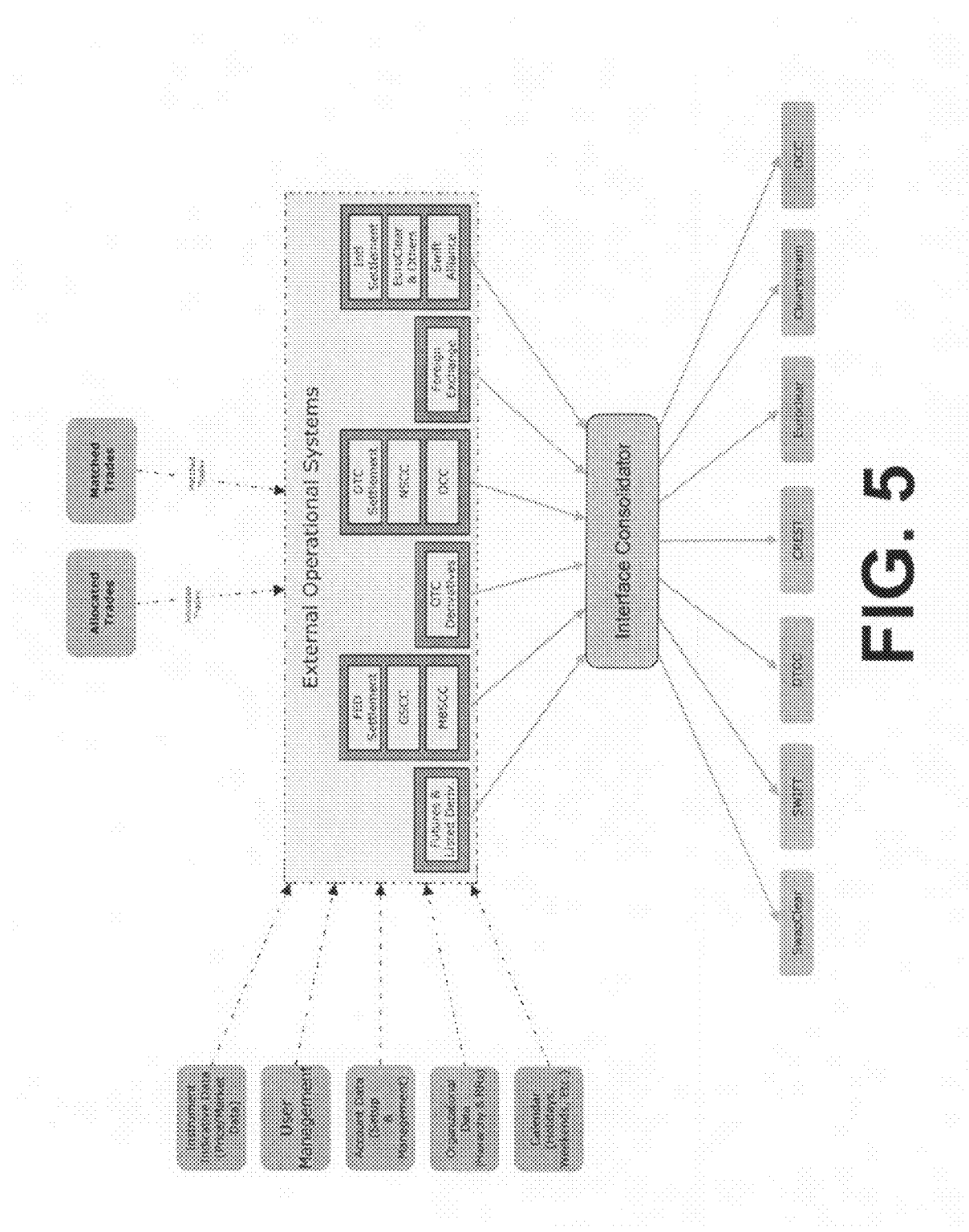
FIG. 5 is a block diagram illustrating an interface simplification achieved using the transaction processing system according to the present invention.

FIG. 5 is a block diagram illustrating another view of the simplification of the transaction processing environment achieved using the transaction processing system according to the present invention. Not only does the transaction processing system of the present invention simplify the transaction processing environment, by consolidating and homogenizing the transactions, the transaction processing system according to the present invention acts as an "interface consolidator" by allowing different applications and systems to interface through a common services architecture.

As described above, the transaction processing system according to the present invention provides a simplified, centralized, and normalized database model to convert aggregated data from large sources on multiple platforms across multiple traded instruments (securities, commodities, futures, options, currency, etc.) having heterogeneous syntax into unified, homogenous records. Accordingly, the transaction processing system according to the present invention reduces expenses by simplifying the processing environment, increases productivity by streamlining business processes, and provides consolidated, holistic views of client portfolios, including cross-margining, and risks in an efficient manner.

Moreover, transaction processing system according to the present invention utilizes an architecture that allows it to be integrated with any legacy system that processes products supported within the transaction engine. Connections to a back office only require the connection to and translation of the new data model. The layered architecture of the transaction processing system isolates the customized work from the transaction engine, thereby allowing simpler and faster integration. Additionally, connection may be made such that the transaction data may be read directly from a client server rather than replicating the transactional data to the staging tables, described in detail below. To that end, custom development is also allowable for integration of a proprietary legacy system. As the transaction system is scalable, addition of new data elements from the legacy systems and new application modules may be easily implemented to take on additional functionalities.

It will be apparent to those skilled in the art that various modifications and variations can be made in the transaction processing system of the present invention without departing form the spirit or scope of the invention. Thus, it is intended that the present invention cover the modifications and variations of this invention provided they come within the scope of the appended claims and their equivalents.

What is claimed is:

1. A computer system for processing securities transactions, comprising:

a selectively programmed transaction interface that obtains transaction data corresponding to a plurality of heterogeneous financial products from at least one external operational system;

a programmed controlled computer implemented transaction engine that processes the transaction data from the external operational system to convert the transaction data into a normalized set of transaction data, and stores the converted transaction data as a series of temporal events in a transaction database; and a computer implemented data access module that provides access to the converted transaction data stored in the transaction database.

2. The system of claim 1, wherein the transaction engine determines balance and position information from the converted and normalized transaction data.

3. The system of claim 1, further comprising a client module that polls the external operational system to obtain the transaction data.

4. The system of claim 3, wherein the client module reads the transaction data directly from the external operational system.

5. The system of claim 3, wherein the client module includes:

at least one staging database that stores the obtained transaction data, and a cross-referencing table that correlates replicated transaction data with the converted transaction data stored in the transaction database.

6. The system of claim 1, wherein the transaction database is updated based on a time trigger.

7. The system of claim 1, wherein the transaction database is updated based on an event trigger.

8. The system of claim 1, wherein the plurality of heterogeneous financial products include currency, securities, options, futures, and derivatives.

9. The system of claim 1, wherein the transaction data includes transactions related to executions, trades, stock movements, and cash items.

10. The system of claim 1, wherein the data access module includes at least one of a web portal, settlement module, a margin advisor module, and a report writer module.

11. The system of claim 10, wherein the report writer module provides historical trends from the transaction data stored in the transaction database.

12. The system of claim 10, wherein the margin advisor module automatically margins an account based on a predetermined trigger event.

13. The system of claim 12, wherein the predetermined trigger event includes a price fluctuation beyond a set threshold.

14. The system of claim 12, wherein the predetermined trigger event includes a change in balance or position of the account.

15. The system of claim 1, wherein the transaction engine assigns a post ID to the transaction data.

16. The system of claim 15, wherein the transaction engine is configured to process a new financial instrument type by the establishment of a new post ID.

17. The system of claim 16, wherein the transaction engine is configured to process the new financial instrument type by adding posting rules to the database.

18. The system of claim 15, wherein the transaction data is processed based on the post ID.

19. A computer implemented method of processing securities transactions, comprising the steps of:

obtaining, by one or more computers, transaction data corresponding to a plurality of heterogeneous financial products from an external operational system;

converting, by said one or more computers, the received transaction data into a normalized transaction data;

storing the normalized transaction data into a computer controlled transaction database as a series of temporal events; and providing the normalized data stored in the transaction database to a data access module.

20. The method of claim 19, further comprising the step of determining balance and position information from the normalized transaction data.

21. The method of claim 19, wherein the step of obtaining the transaction data includes polling the external operational system.

22. The method of claim 19, wherein the step of obtaining the transaction data includes reading the transaction data directly from the external operational system.

23. The method of claim 19, further comprising the steps of:

replicating the transaction data in at least one staging database; and cross-referencing the replicated transaction data in a cross-referencing table to correlate the replicated transaction data with the normalized transaction data stored in the transaction database.

24. The method of claim 19, wherein the transaction database is updated based on a time trigger.

25. The method of claim 19, wherein the transaction database is updated based on an event trigger.

26. The method of claim 19, wherein the plurality of heterogeneous financial products include currency, securities, options, futures, and derivatives.

27. The method of claim 19, wherein the transaction data includes transactions related to executions, trades, stock movements, and cash items.

28. The method of claim 19, wherein the data access module includes at least one of a web portal, settlement module, a margin advisor module, and a report writer module.

29. The method of claim 28, wherein the report writer module provides historical trends from the transaction data stored in the transaction database.

30. The method of claim 28, wherein the margin advisor module automatically margins an account based on a predetermined trigger event.

31. The method of claim 30, wherein the predetermined trigger event includes a price fluctuation beyond a set threshold.

32. The method of claim 30, wherein the predetermined trigger event includes a change in balance or position of the account.

33. A computer system for processing securities transactions, comprising:

a program controlled data consolidator that obtains transaction data in a predefined format corresponding to a plurality of heterogeneous financial products from at least one external operational system on a continuous, real-time basis, and to convert the transaction data into a common format;

a program controlled transaction database that stores the converted transaction data as a series of temporal events; and an program controlled interface consolidator that provides a common interface that allows access to the converted transaction data stored in the transaction database.

34. The system of claim 33, wherein the interface consolidator includes cross-referencing table that maps the converted transaction data in the common format with the transaction data in the predefined format.

35. A computer system for processing securities transactions, comprising:

a program controlled transaction interface that obtains transaction data corresponding to a plurality of heterogeneous financial products from at least one external operational system on a continuous, real-time basis;

a program controlled transaction engine that processes the transaction data from the client module to convert and normalize the transaction data, and stores the converted transaction data as a series of temporal events in a transaction database; and a program controlled data access module that provides access to the converted transaction data stored in the transaction database.

36. A computer implemented method of processing securities transactions, comprising the steps of:

obtaining, by one or more computers, transaction data corresponding to a plurality of heterogeneous financial products from an external operational system on a continuous, real-time basis;

converting, by said one or more computers, the received transaction data into a normalized transaction data;

storing the normalized transaction data into a computer controlled transaction database as a series of temporal events; and providing the normalized data stored in the transaction database to a data access module.

* * * * *